(Model.)

I. VAN KERSEN.
BLIND SLAT LOCK AND OPERATOR.

No. 297,204. Patented Apr. 22, 1884.

Witnesses:
L. N. Burke
P. H. Burke

Inventor:
Izaak Van Kersen

UNITED STATES PATENT OFFICE.

IZAAK VAN KERSEN, OF KALAMAZOO, MICHIGAN.

BLIND-SLAT LOCK AND OPERATOR.

SPECIFICATION forming part of Letters Patent No. 297,204, dated April 22, 1884.

Application filed August 4, 1883. (Model.)

*To all whom it may concern:*

Be it known that I, IZAAK VAN KERSEN, a citizen of the United States, residing at Kalamazoo, in the county of Kalamazoo and State of Michigan, have invented a new and useful Blind-Slat Lock and Adjuster, of which the following is a specification.

My invention relates to a friction crank-wheel and connecting-rods to lock and open the slats of common inside and outside window-blinds. I attain these objects by the mechanism illustrated in the accompanying drawings, in which—

Figure 1:
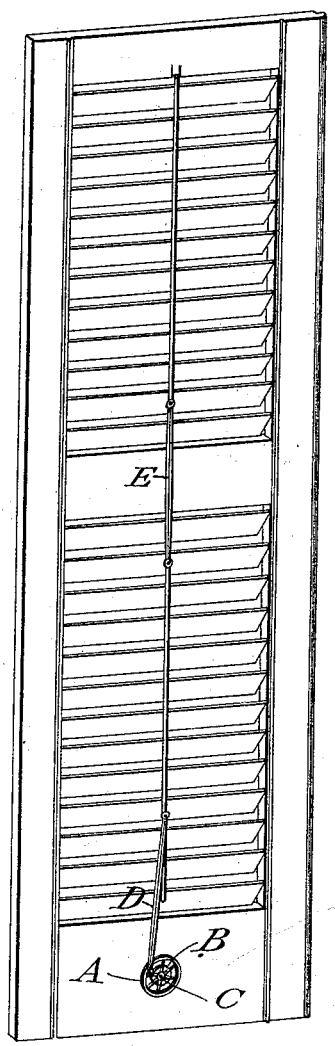
Figure 2:
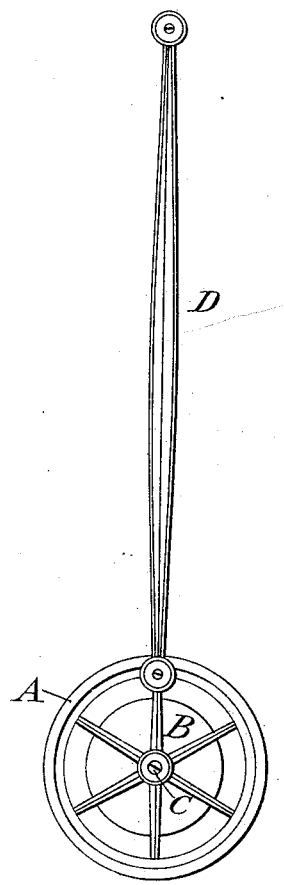

Figure 1 is a perspective view of a common window-blind provided with my invention, and Fig. 2 a vertical front view of the friction crank-wheel and connecting-rod.

Similar letters refer to similar parts throughout the several views.

A, Fig. 1, designates the friction crank-wheel, and B indicates the friction-spring, fastened to the same by the center-screw C which enters the frame of a common window-blind. The friction is adjusted by the same center-screw, C, by which the crank-wheel A is pressed to the friction-spring B. The connecting-rod D is fastened to the handle or crank-pin below, and at its upper end to the slat-bar of the under panel. This is combined with the friction crank-wheel attached to the slat-bar of under panel. The connecting-rod E connects the slat-bar of the under panel to the slat-bar of the upper panel of the blind, to make the new arrangement of crank-wheel A, connecting-rods D and E, &c.

Fig. 2 illustrates the friction crank-wheel A, the friction-spring B, center-screw C, and the connecting-rod D in a perpendicular position.

The operation of this invention is as follows: By turning the friction crank-wheel A the slat-bars will move up or down, and also the slats, to a desired position, and are held by the friction of the crank-wheel; and by raising the connecting-rod D to a perpendicular position, the slats are locked on the inside of the panels by the friction crank-wheel, and the slats cannot be opened from the outside.

I am aware that prior to my invention blind-stops have been made with friction-rods and friction-springs and connecting-rods; also crank-wheels for every use, (but not friction crank-wheels for blind-slat locks and adjusters or any use.) I therefore do not claim such a combination, broadly; but What I do claim as my invention, and desire to secure by Letters Patent of the United States, is—

In a blind-slat stop and adjuster, the combination of the friction crank-wheel A, having a friction-spring, B, and a center-screw, C, by which the crank-wheel A is fastened to the frame and pressed to the spring B to a desired friction on the crank-wheel, and the rod D, connecting the slat-bar with the crank-wheel, substantially as described, for the purpose specified.

IZAAK VAN KERSEN.

Witnesses:
L. N. BURKE,
FRANK E. KNAPPEN.